United States Patent
Guo

(10) Patent No.: US 10,048,723 B2
(45) Date of Patent: Aug. 14, 2018

(54) POWER SUPPLY MODULE AND SMART WEARABLE DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventor: Mengran Guo, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 126 days.

(21) Appl. No.: 15/240,081

(22) Filed: Aug. 18, 2016

(65) Prior Publication Data

US 2017/0192452 A1 Jul. 6, 2017

(30) Foreign Application Priority Data

Jan. 5, 2016 (CN) .......................... 2016 1 0005348

(51) Int. Cl.
| | |
|---|---|
| *G06F 1/16* | (2006.01) |
| *H02S 40/30* | (2014.01) |
| *H02S 40/38* | (2014.01) |
| *G06F 1/26* | (2006.01) |
| *H02J 9/06* | (2006.01) |
| *H02J 7/35* | (2006.01) |

(52) U.S. Cl.
CPC .............. *G06F 1/163* (2013.01); *G06F 1/263* (2013.01); *H02J 7/35* (2013.01); *H02J 9/061* (2013.01); *H02S 40/30* (2014.12); *H02S 40/38* (2014.12)

(58) Field of Classification Search
CPC ............. H02J 7/35; H02S 40/38; G06F 1/263
See application file for complete search history.

(56) References Cited

U.S. PATENT DOCUMENTS 8,310,094 B2 * 11/2012 Yamada .................... H02J 7/35
307/46

FOREIGN PATENT DOCUMENTS

| CN | 101375482 A | 2/2009 |
|---|---|---|
| CN | 101741133 A | 6/2010 |
| CN | 101888113 A | 11/2010 |
| CN | 103219788 A | 7/2013 |
| CN | 105048935 A | 11/2015 |
| CN | 105093956 A | 11/2015 |
| CN | 204794344 U | 11/2015 |
| JP | 10285825 A | 10/1998 |

OTHER PUBLICATIONS

China First Office Action, Application No. 201610005348.9, dated Oct. 9, 2017, 14 pps.: with English translation.
"TPS76350", apanghuang29, http://www.docin.com/p-1003304746.html, 2 pps.
China Second Office Action, Application No. 201610005348.9, dated Apr. 16, 2018, 15 pps.: with English translation.

* cited by examiner

*Primary Examiner* — Robert Deberadinis
(74) *Attorney, Agent, or Firm* — Armstrong Teasdale LLP

(57) ABSTRACT

The present disclosure provides for a power supply module for supplying a power to a load. The power supply module includes a solar battery and a storage battery. The solar battery is configured to supply power to the load when the solar battery is irradiated by light to generate electrical energy. The storage battery is configured to supply power to the load when the solar battery does not supply power to the load.

19 Claims, 2 Drawing Sheets

POWER SUPPLY MODULE AND SMART WEARABLE DEVICE

CROSS REFERENCE TO RELATED APPLICATIONS

This application claims the benefit and priority of Chinese Patent Application No. 201610005348.9 filed Jan. 5, 2016. The entire disclosure of the above application is incorporated herein by reference.

BACKGROUND

The present disclosure relates to the field of smart device technologies, and particularly to a power supply module and a smart wearable device.

The concept of smart wearable devices has received more attention in recent years, and thus various smart wearable devices have emerged in the market. Smart wearable devices have various functions and advantages. The existing problems of the technology require urgent resolution. One of the most important problems is the endurance capacity. Even in a normal use condition, some smart wearable devices cannot meet one day's usage requirement on a full charge, which causes diminished convenience of the device.

BRIEF DESCRIPTION

Embodiments of the present disclosure provide an improved power supply module and a smart wearable device.

According to a first aspect of the present disclosure, there is provided a power supply module for supplying power to a load. The power supply module includes a solar battery and a storage battery, wherein the solar battery is configured to supply power to the load when the solar battery is irradiated by light to generate electric energy, and the storage battery is configured to supply power to the load when the solar battery does not supply power to the load.

In the embodiments of the present disclosure, an output end of the solar battery and an output end of the storage battery are connected to an common output end, and the power supply module further includes a first switch unit disposed between the common output end and the storage battery, wherein the first switch unit is configured to be in a cut-off state when the solar battery supplies power to the load.

In the embodiments of the present disclosure, the first switch unit is a first diode, a positive electrode of the first diode is connected to the storage battery, a negative electrode is connected to the common output end, and wherein a working voltage at which the solar battery supplies power to the load is greater than that at which the storage battery supplies power to the load.

In the embodiments of the present disclosure, the power supply module further includes a second switch unit disposed between the common output end and the solar battery, wherein the second switch unit is configured to be in a cut-off state when the voltage at the common output end is higher than that of the output end of the solar battery.

In the embodiments of the present disclosure, the power supply module further includes a first current limitation unit, disposed between the first switch unit and the common output end, and a second current limitation unit, disposed between the second switch unit and the common output end.

In the embodiments of the present disclosure, the power supply module further includes a first capacitor, wherein one end of the first capacitor is connected to the common output end and the other end is grounded.

In the embodiments of the present disclosure, the solar battery includes a solar panel, configured to convert received light energy to electric energy, and a voltage stabilization unit, configured to stabilize the voltage outputted by the solar panel.

In the embodiments of the present disclosure, the solar battery further includes a third diode and a second capacitor, wherein an anode of the third diode is connected to an anode of the solar panel, a cathode of the solar panel is grounded, and one end of the second capacitor is grounded and the other end is connected to a cathode of the third diode.

In the embodiments of the present disclosure, the voltage stabilization unit includes a voltage stabilization chip, a fourth diode, a third capacitor, a fourth capacitor, a first resistor and a second resistor, an input end and an enable end of the voltage stabilization chip are connected to the cathode of the third diode, an output end of the voltage stabilization chip is connected to an anode of the fourth diode, a feedback end of the voltage stabilization chip is connected to one end of the third capacitor, one end of the first resistor and one end of the second resistor, the other end of the third capacitor and the other end of the first resistor are grounded, the other end of the second resistor is connected to the output end of the voltage stabilization chip, and one end of the fourth capacitor is connected to the output end of the voltage stabilization chip and the other end of the fourth capacitor is grounded.

In the embodiments of the present disclosure, the third diode and the fourth diode are Schottky diodes.

In the embodiments of the present disclosure, the solar battery is configured to supply power to the load when the solar battery receives light whose frequency is higher than a preset frequency.

According to a second aspect of the present disclosure, there is provided a smart wearable device, including the foregoing power supply module.

According to the foregoing technical solutions, in the power supply module and the smart wearable device provided by the embodiments of the present disclosure, when the ambient light can excite the solar battery to work, the solar battery may supply power to the load, and in other cases the storage battery may supply power to the load, so that diversification of power supply sources may be achieved for the load, and the endurance capacity of the smart wearable device is improved accordingly.

BRIEF DESCRIPTION OF THE DRAWINGS

Features and advantages of the present disclosure will be more clearly understood by reference to the drawings. These drawings are exemplary and should not be construed as a limit to the present disclosure, in the drawings.

DETAILED DESCRIPTION

To more clearly understand above-mentioned features and advantages of the present disclosure, the following will further describe in detail the present disclosure with reference to the accompanying drawings and the embodiments. It should be explained that the embodiments and features in the embodiments of the present disclosure may be mutually combined without conflict.

Many specific details are set forth in the following description to fully understand the present disclosure. However, the present disclosure also may be implemented by using other implementations different from those described herein. Therefore, the scope of protection of the present disclosure is not limited by the following disclosed embodiments.

Figure 1:
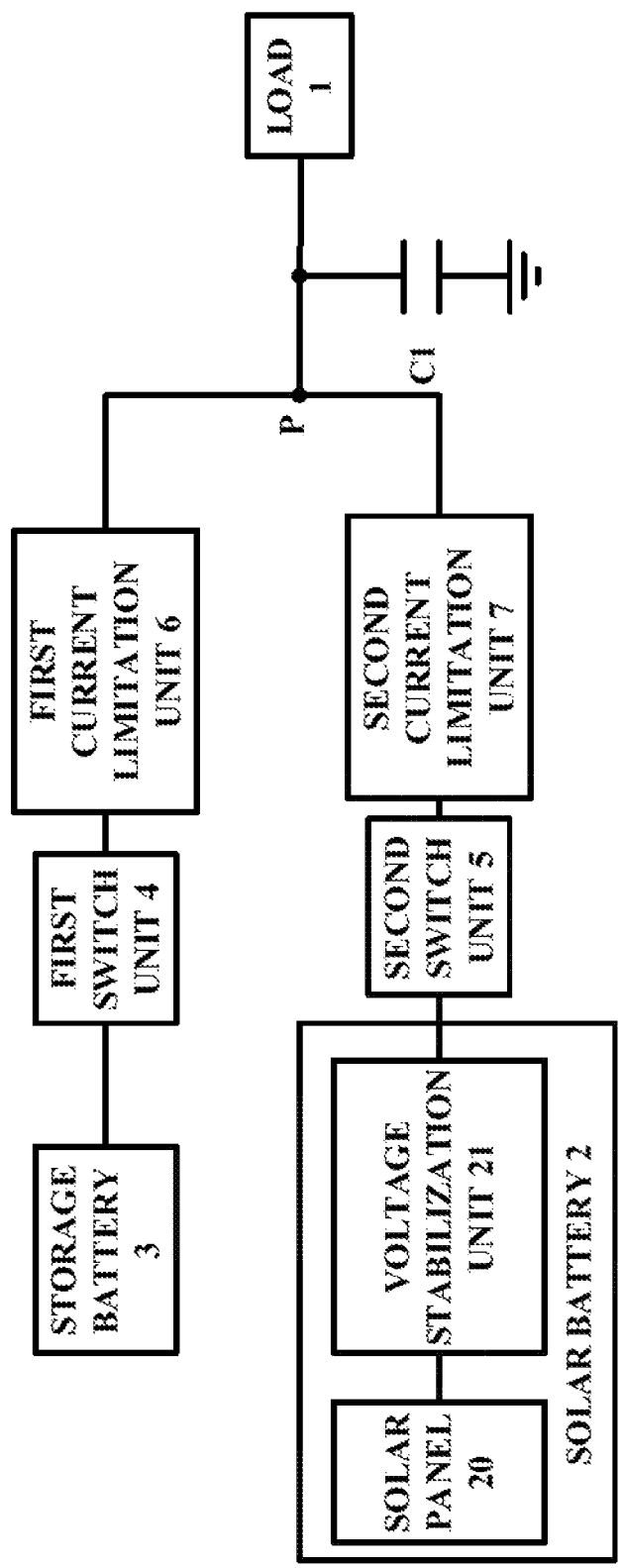
FIG. 1 is a schematic diagram of power supply structures of a power supply module and a smart wearable device using the power supply module according to embodiments of the present disclosure.

FIG. 1 is a schematic diagram of power supply structures of a power supply module and a smart wearable device using the power supply module according to embodiments of the present disclosure. As shown in FIG. 1, the smart wearable device includes a power supply module and a load 1, the power supply module includes a solar battery 2 and a storage battery 3, wherein the solar battery 2 supplies power to the load 1 when the solar battery 2 is irradiated by light to generate electric energy, and the storage battery 3 supplies power to the load 1 when the solar battery 2 does not supply power to the load 1.

Whether the solar battery 2 can generate electric energy to drive the load is related to frequency of irradiation light and so on. Therefore, in the embodiments of the present disclosure, it may be set as below: the solar battery 2 supplies power to the load 1 when the solar battery 2 receives light whose frequency is greater than a preset frequency (for example, the minimum frequency exciting the solar battery to convert light energy to electric energy); and the storage battery 3 supplies power to the load 1 when the solar battery 2 does not receive light whose frequency is greater than the preset frequency.

In the embodiments of the present disclosure, when the ambient light can excite the solar battery to work (converting light energy to electric energy), the solar battery in the power supply module may supply power to the load, and in other cases the storage battery may supply power to the load, so that diversification of power supply sources may be achieved for the load, and the endurance capacity of a device (for example, the smart wearable device), in which the power supply module is used, is improved.

In the embodiments of the present disclosure, an output end of the solar battery 2 and an output end of the storage battery 3 are connected to an identical common output end P, and a first switch unit 4 is disposed between the common output end P and the storage battery 3, wherein the first switch unit 4 is in a cut-off state when the solar battery 2 supplies power to the load 1.

The first switch unit 4 may prevent current from flowing backward to the storage battery 3 when the voltage of the common output end P is higher, thereby preventing the storage battery 3 from being destroyed. The solar battery 2 supplies power to the load preferentially, thereby fully utilizing the ambient light to achieve a better endurance effect.

In the embodiments of the present disclosure, the first switch unit 4 is a first diode, a positive electrode of the first diode is connected to the storage battery 3, and a negative electrode is connected to the common output end P, and a working voltage at which the solar battery 2 supplies power to the load 1 is greater than that at which the storage battery 3 supplies power to the load 1.

The working voltage of the solar battery 2 may be set to be greater than that of the storage battery 3. Therefore, when the solar battery 2 supplies power to the load 1, the first diode may be reversely cut-off so that the solar battery 2 supplies power to the load 1 preferentially and the current is prevented from flowing backward to the storage battery 3. For example, the working voltage of the solar battery may be 3.8V, and the working voltage of the storage battery may be 3.5V.

In the embodiments of the present disclosure, the power supply module further includes a second switch unit 5 disposed between the common output end and the solar battery, wherein the second switch unit 5 is in a cut-off state when the voltage of the common output end P is higher than that of the output end of the solar battery 2. The second switch unit 5 may also be a diode.

In the embodiments of the present disclosure, the second switch unit 5 may prevent current from flowing backward to the solar battery 2 when the voltage of the common output end P is higher, thereby preventing the solar battery 2 from being destroyed.

In the embodiments of the present disclosure, the power supply module further includes a first current limitation unit 6 disposed between the first switch unit 4 and the common output end P, and a second current limitation unit 7 disposed between the second switch unit 5 and the common output end P.

In the embodiments of the present disclosure, the first current limitation unit 6 and the second current limitation unit 7 may prevent the load 1 from being damaged because the current of the storage battery 3 or the solar battery 2 is too large. The first current limitation unit 6 and the second current limitation unit 7 may be resistors.

In the embodiments of the present disclosure, the power supply module further includes a first capacitor C1, wherein one end thereof is connected to the common output end P and the other end is grounded.

In the embodiments of the present disclosure, the first capacitor C1 may be set larger, for example 1 mF, so as to store a part of electric energy supplied to the load 1. For example, in a stage wherein the load 1 is power-supplied by the solar battery 2, the voltage at one end of the first capacitor C1 connected to the load 1 is consistent with the working voltage of the solar battery 2. When the load 1 is switched to be power-supplied by the storage battery 3, since the voltage across the first capacitor C1 is not allowed to change suddenly, the voltage at one end of the first capacitor C1 connected to the load 1 may be gradually reduced until equal to the voltage supplied by the storage battery 3. In this way, it is avoided that the supply voltage of the load 1 changes suddenly when the load 1 is switched to be power-supplied by the solar battery 2 or by the storage battery 3, thereby ensuring the load 1 to work normally.

In the embodiments of the present disclosure, the solar battery 2 includes a solar panel 20, configured to convert received light energy to electric energy, and a voltage stabilization unit 21, configured to stabilize the voltage outputted by the solar panel 20.

Since the ambient light generally is not stable, the voltage outputted by the solar battery 2 also may be not stable. The voltage stabilization unit 21 can stabilize the voltage outputted for use by the load 1.

Figure 2:
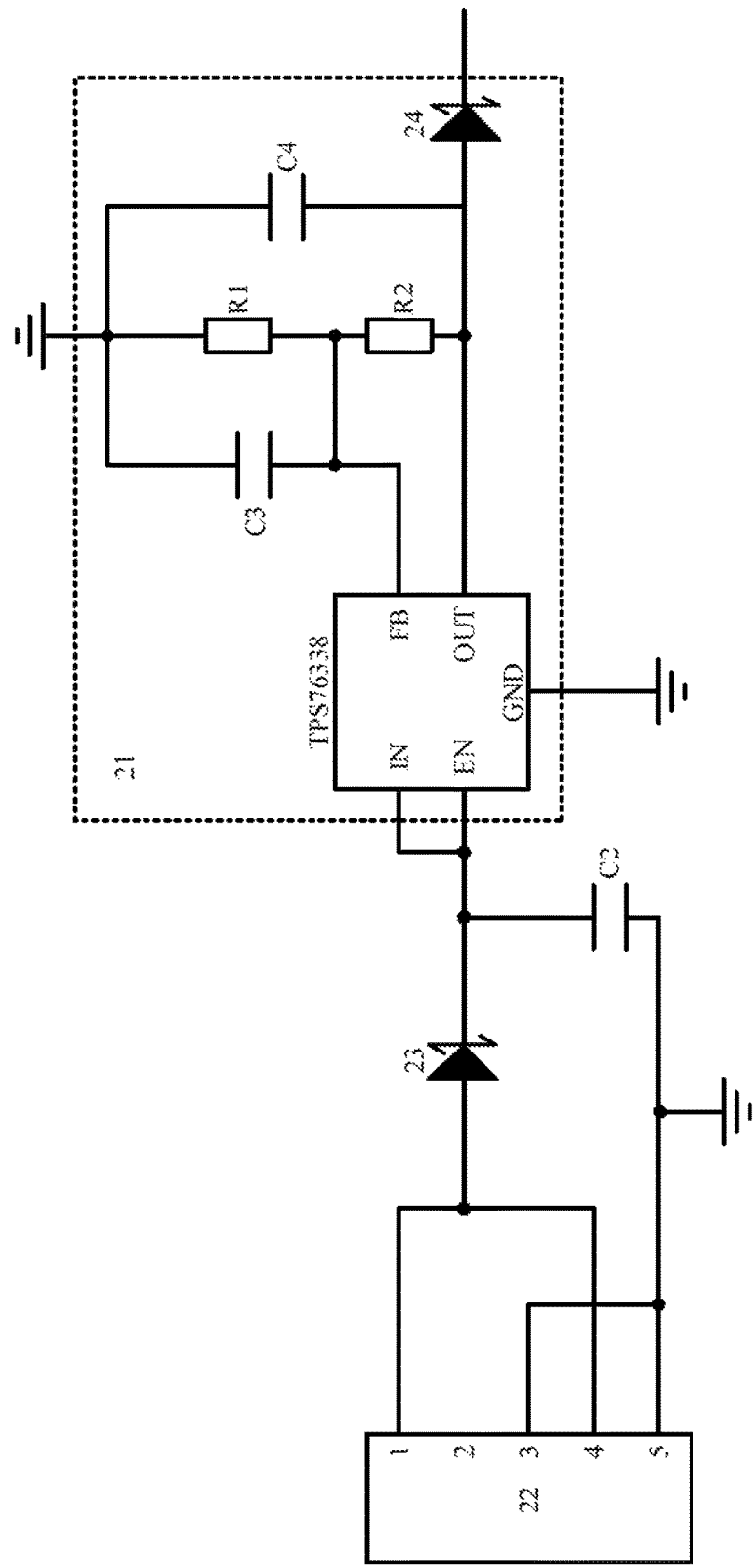
FIG. 2 is a schematic structural diagram of a solar battery according to embodiments of the present disclosure.

As shown in FIG. 2, in the embodiments of the present disclosure, the solar battery 2 further includes a five-pin socket 22, the solar panel (not shown in FIG. 2) is fixed to the socket 22, a first pin and a fourth pin of the socket 22 are connected to the anode of the solar panel, and a third pin and a fifth pin are connected to the cathode of the solar panel.

The solar panel may be disposed on an outer shell of a printed circuit board (PCB) of the smart wearable device, taking a smart wristband as an example, a solar panel about 25 square centimeters may be formed. Assuming the power of sunlight is 1 kW/m2 and a conversion rate is 10%, the current outputted by the solar panel is about 50 mA, and electric power outputted in two hours may reach 100 mA·H, which may be suitable for well supplying power for the smart wearable device.

In the embodiments of the present disclosure, the solar battery 2 further includes a third diode 23, wherein an anode of the third diode 23 is connected to a first pin and a fourth pin of the socket 22, and the third pin and the fifth pin of the socket 22 are grounded, a second capacitor C2, wherein one end is grounded, and the other end is connected to a cathode of a third diode 23, the voltage stabilization unit 21 includes a voltage stabilization chip, for example, a TPS76338 chip, wherein an input end IN and an enable end EN of the chip are connected to the cathode of the third diode 23, an output end OUT is connected to an anode of a fourth diode 24, a feedback end FB is connected to one end of a third capacitor C3, one end of a first resistor R1 and one end of a second resistor R2, the other end of the third capacitor C3 and the other end of the first resistor R1 are grounded, the other end of the second resistor R2 is connected to the output end OUT of the chip, one end of a fourth capacitor C4 is connected to the output end OUT of the chip, and the other end of the fourth capacitor C4 is grounded.

In the embodiments of the present disclosure, the third diode 23 may prevent the voltage stabilization unit and elements thereafter from generating reverse current to impact and damage the solar panel. The second capacitor C2 may filter an electric signal outputted by the solar panel.

The first resistor R1 and the second resistor R2 may divide the voltage outputted by the voltage stabilization chip so that the voltage outputted by the fourth diode 24 is 3.8V, which is slightly higher than the output voltage of the storage battery 3 but not higher than the rated voltage of the load 1. The third capacitor C3 may store the voltage obtained by the first resistor R1, the fourth capacitor C4 may filter the voltage outputted by the voltage stabilization chip, and the fourth diode 24 may prevent elements after the voltage stabilization chip from generating reverse current to impact and damage the voltage stabilization chip.

In the embodiments of the present disclosure, the third diode 23 and the fourth diode 24 are Schottky diodes.

The technical solutions of the present disclosure are described in detail with reference to the accompanying drawings above. In the power supply module and the smart wearable device provided by the embodiments of the present disclosure, when the ambient light can excite the solar battery to work, the solar battery in the power supply module may supply power to the load, and in other cases the load may be power-supplied by the storage battery, so that diversification of power supply sources may be achieved for an apparatus (for example, the smart wearable device) in which the power supply module is used, and the endurance capacity of the smart wearable device is improved.

In the present disclosure, terms "first", "second", "third" and "fourth" are merely for description purposes, and are not construed as indicating or implying relative importance.

The above embodiments are merely example embodiments of the present disclosure, and are not intended to limit the present disclosure. To those skilled in the art, the present disclosure may have various alterations and variations. All modifications, equivalent substitutions and improvements made within the spirit and the principle of the present disclosure shall fall within the scope of protection of the present disclosure.

What is claimed is:

1. A power supply module for supplying power to a load, the power supply module comprising:
    a solar battery configured to supply power to the load when the solar battery is irradiated by light to generate electric energy;
    a storage battery configured to supply power to the load when the solar battery does not supply power to the load;
    wherein an output end of the solar battery and an output and of the storage batter are connected to a common output end; and
    a first capacitor, wherein one end of the first capacitor is connected to the common output end and the other end of the first capacitor is grounded.

2. The power supply module according to claim 1, wherein the power supply module further comprises a first switch unit disposed between the common output end and the storage battery, and wherein the first switch unit is configured to be in a cut-off state when the solar battery supplies power to the load.

3. The power supply module according to claim 2, wherein the first switch unit is a first diode, wherein a positive electrode of the first diode is connected to the storage battery, wherein a negative electrode is connected to the common output end, and wherein a working voltage at which the solar battery supplies power to the load is greater than that at which the storage battery supplies power to the load.

4. The power supply module according to claim 3, further comprising a second switch unit disposed between the common output end and the solar battery, wherein the second switch unit is configured to be in a cut-off state when the voltage of the common output end is higher than that of the output end of the solar battery.

5. The power supply module according to claim 4, further comprising:
    a first current limitation unit disposed between the first switch unit and the common output end; and
    a second current limitation unit disposed between the second switch unit and the common output end.

6. The power supply module according to claim 5, wherein the solar battery comprises:
    a solar panel configured to convert received light energy to electric energy; and
    a voltage stabilization unit configured to stabilize the voltage outputted by the solar panel.

7. The power supply module according to claim 2, wherein the solar battery comprises:
    a solar panel configured to convert received light energy to electric energy; and
    a voltage stabilization unit configured to stabilize the voltage outputted by the solar panel.

8. The power supply module according to claim 3, wherein the solar battery comprises:
    a solar panel configured to convert received light energy to electric energy; and
    a voltage stabilization unit configured to stabilize the voltage outputted by the solar panel.

9. The power supply module according to claim 4, wherein the solar battery comprises:
    a solar panel configured to convert received light energy to electric energy; and
    a voltage stabilization unit configured to stabilize the voltage outputted by the solar panel.

10. The power supply module according to claim 1, wherein the solar battery comprises:

a solar panel configured to convert received light energy to electric energy; and a voltage stabilization unit configured to stabilize the voltage outputted by the solar panel.

11. The power supply module according to claim 10, wherein the solar battery further comprises a third diode and a second capacitor, wherein an anode of the third diode is connected to an anode of the solar panel, wherein a cathode of the solar panel is grounded, and wherein one end of the second capacitor is grounded and the other end of the second capacitor is connected to a cathode of the third diode.

12. The power supply module according to claim 11, wherein the voltage stabilization unit comprises a voltage stabilization chip, a fourth diode, a third capacitor, a fourth capacitor, a first resistor and a second resistor, wherein an input end and an enable end of the voltage stabilization chip are connected to the cathode of the third diode, wherein an output end of the voltage stabilization chip is connected to an anode of the fourth diode, wherein a feedback end of the voltage stabilization chip is connected to one end of the third capacitor, wherein one end of the first resistor and one end of the second resistor, wherein the other end of the third capacitor and the other end of the first resistor are grounded, wherein the other end of the second resistor is connected to the output end of the voltage stabilization chip, wherein a cathode of the fourth diode is connected to the output end of the solar battery, and wherein one end of the fourth capacitor is connected to the output end of the voltage stabilization chip and the other end of the fourth capacitor is grounded.

13. The power supply module according to claim 12, wherein the third diode and the fourth diode are Schottky diodes.

14. The power supply module according to claim 1, wherein the solar battery comprises:

a solar panel configured to convert received light energy to electric energy, and a voltage stabilization unit configured to stabilize the voltage outputted by the solar panel.

15. The power supply module according to claim 1, wherein the solar battery is configured to supply power to the load when the solar battery receives light whose frequency is higher than a preset frequency.

16. A smart wearable device, comprising the power supply module according to claim 1.

17. The smart wearable device according to claim 16, wherein an output end of the solar battery and an output end of the storage battery are connected to an common output end, wherein the power supply module further comprises a first switch unit disposed between the common output end and the storage battery, and wherein the first switch unit is configured to be in a cut-off state when the solar battery supplies power to the load.

18. The smart wearable device according to claim 17, wherein the first switch unit is a first diode, wherein a positive electrode of the first diode is connected to the storage battery, wherein a negative electrode is connected to the common output end, and wherein a working voltage at which the solar battery supplies power to the load is greater than that at which the storage battery supplies power to the load.

19. The smart wearable device according to claim 18, wherein the power supply module further comprises a second switch unit disposed between the common output end and the solar battery, and wherein the second switch unit is configured to be in a cut-off state when the voltage of the common output end is higher than that of the output end of the solar battery.

* * * * *

UNITED STATES PATENT AND TRADEMARK OFFICE
CERTIFICATE OF CORRECTION

PATENT NO.        : 10,048,723 B2
APPLICATION NO.   : 15/240081
DATED             : August 14, 2018
INVENTOR(S)       : Mengran Guo It is certified that error appears in the above-identified patent and that said Letters Patent is hereby corrected as shown below:

In the Claims

In Claim 1, Column 6, Line 11, delete "and of the storage batter" and insert therefor -- end of the storage battery --.

Signed and Sealed this
Twenty-sixth Day of February, 2019

Andrei Iancu
*Director of the United States Patent and Trademark Office*